United States Patent [19]
Julian et al.

[11] Patent Number: 4,473,264
[45] Date of Patent: Sep. 25, 1984

[54] BATTERY CABLE

[76] Inventors: Victor J. Julian, 2400 Belvue, Westchester, Ill. 60153; Kenneth A. Julian, 409 Suffolk La., Oak Brook, Ill. 60521

[21] Appl. No.: 355,321

[22] Filed: Mar. 8, 1982

[51] Int. Cl.³ .............................................. H01R 3/00
[52] U.S. Cl. .................................... 339/36; 29/623.1; 339/116 R; 339/224; 339/198 J
[58] Field of Search ............................... 339/224–240, 339/95 R, 95 B, 32, 36, 14 L, 263 B, 116 R; 29/623.1, 858, 857, 861

[56] References Cited
U.S. PATENT DOCUMENTS

| Re. 26,486 | 11/1968 | Haegert | 339/263 B |
| 3,413,593 | 11/1968 | Schaefer | 339/263 B |
| 4,049,335 | 9/1977 | Julian et al. | 339/224 |

FOREIGN PATENT DOCUMENTS 1220862  1/1971  United Kingdom ............... 339/224

*Primary Examiner*—John McQuade
*Assistant Examiner*—David L. Pirlot
*Attorney, Agent, or Firm*—Edmond T. Patnaude

[57] ABSTRACT

A battery cable has a termination at one end for electric connection to the threaded terminal of a storage battery, which termination also includes an upstanding threaded stud for connection to another battery cable or to other auxiliary equipment.

16 Claims, 5 Drawing Figures

U.S. Patent      Sep. 25, 1984      4,473,264
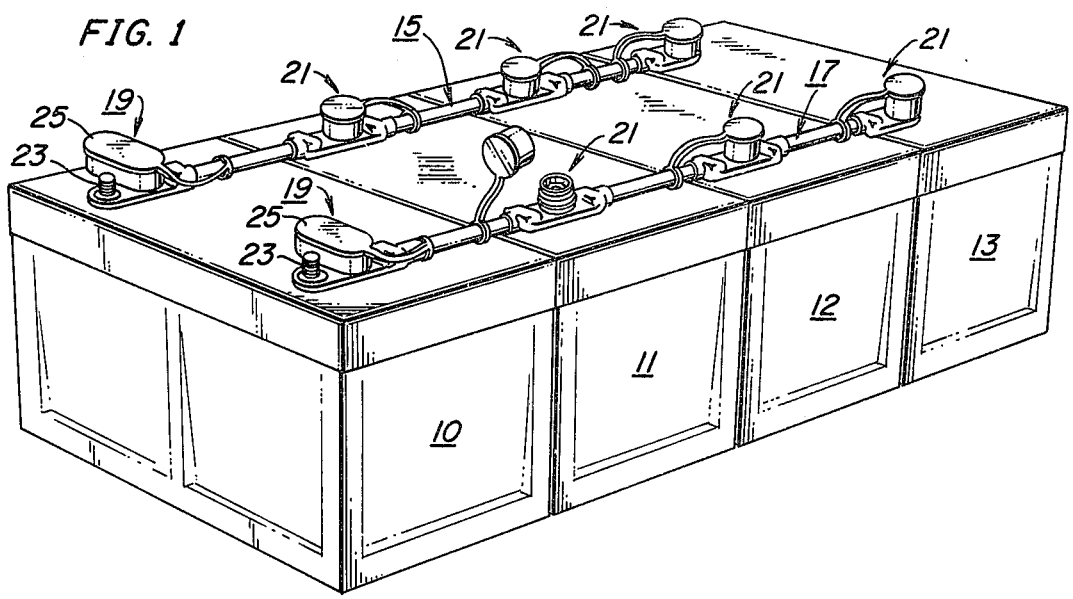
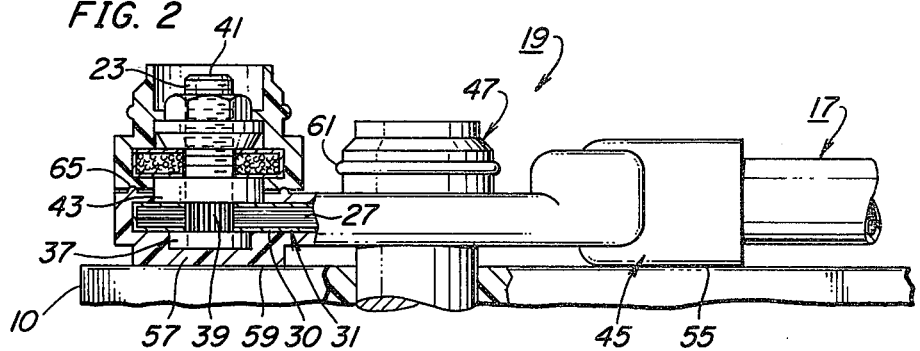
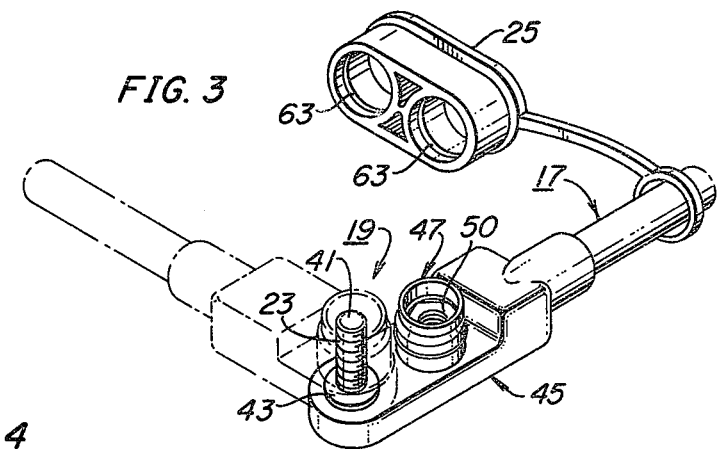
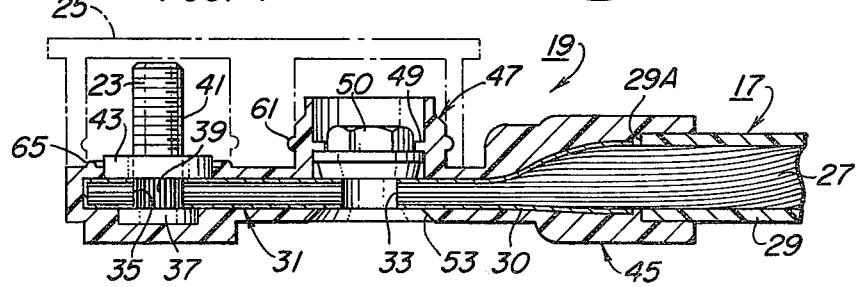
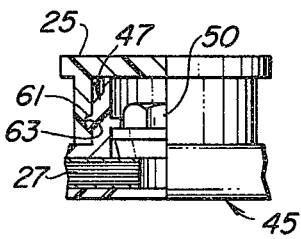

BATTERY CABLE

The present invention relates in general to battery cables and cable terminations for connection to the terminals of wet cell storage batteries, and it relates in particular to a new and improved termination having an integral auxiliary stud for connecting the battery to other equipment or batteries.

BACKGROUND OF THE INVENTION

Automotive vehicles and particularly trucks are commonly provided with a plurality of storage batteries for powering the vehicle or in some cases for powering the electric starter motor of the vehicle. In such cases the batteries are connected together by wiring harnesses incorporating two or more battery cables. Preferably the terminations are sealed from the ambient to reduce corrosion and to prevent inadvertent contact with the battery terminals. When these types of terminations are used it is very difficult, if not impossible, to connect auxiliary equipment to the batteries or to use the batteries to power the starter motor of another vehicle.

It would be desirable, therefore, to provide such cables with auxiliary terminals which can be sealed from the ambient when not in use, which auxiliary terminals should be strong and durable in construction.

SUMMARY OF THE INVENTION

Briefly, there is provided in accordance with the present invention a novel battery cable and termination having an integral terminal stud adjacent the battery terminal connector portion of the stud. Preferably, the auxiliary terminal stud is dimensionally the same as a conventional threaded battery stud so as to be usable with other conventional battery cable terminations when it is desired to do so.

In the preferred embodiment of the invention the termination comprises a metal tube which is flattened over the exposed ends of a stranded wire cable and is apertured at one location to receive a battery terminal stud at a second location to receive the auxiliary terminal stud, the latter being fixedly and nonrotatably secured in the aperture at the second location. The termination is encased in an insulation cover which is molded over the metal tube in sealing engagement with the insulating cover of the cable.

BRIEF DESCRIPTION OF THE DRAWING

The present invention will be better understood by a reading of the following detailed description taken in connection with the accompanying drawing wherein:

FIG. 1 is a perspective view of a plurality of batteries connected together by means of battery cables embodying the present invention;

FIG. 2 is an elevational view, partly in cross-section, of a battery cable termination embodying the present invention, the termination being connected to a stud type battery terminal and to another battery cable;

FIG. 3 is a perspective view of the cable termination shown in FIGS. 1 and 2;

FIG. 4 is a cross-sectional view of a battery cable termination embodying the present invention; and FIG. 5 is a fragmentary, partially sectioned view of the termination of FIG. 4 with a sealing cap in place thereon.

DETAILED DESCRIPTION OF THE INVENTION

Referring to FIG. 1, there is shown a plurality of wet cell storage batteries 10, 11, 12 and 13 which are conventional twelve volt batteries of the type used in automotive vehicles. They each include two threaded terminal studs (not visible in the drawing). One of these terminal studs on each battery is at a voltage of twelve volts positive relative to the other terminal on the respective battery, which latter terminal is generally connected to ground when the batteries are in use. A battery cable 15 having a plurality of terminations is connected between like polarity terminals of the batteries 10-13 and a similar battery cable 17 is connected to the other like polarity terminals of the batteries. The cables 15 and 17 are each provided with a novel end termination 19 which is described in detail hereinafter. The cables further include a plurality of other terminations which may be of the general types disclosed in U.S. Pat. No. 4,049,335. These latter terminations are identified by the reference character 21.

The terminations 19 are identical and each includes an auxiliary terminal stud 23 which facilitates connecting the battery cables 15 and 17 to other electrically powered equipment. The terminations 19 also include a sealing cap 25 which may be positioned, as shown in FIG. 1, over the battery stud connector portion of the termination only or sealably positioned over both the battery stud connector portion and the auxiliary stud 23. It will be seen that the portion of the termination 19 including the auxiliary stud 23 provides a stackable type connector over which terminations of the type shown in 21 may be stacked. FIG. 2 shows a stacked connection of this type.

Refer now to FIGS. 2, 3 and 4, for a better understanding of the construction of the terminations 19. As there shown, the battery cable 17 includes a stranded wire cable portion 27 which is enclosed within an insulating cover or sheath 29. The cover 29 terminates at 29A and the exposed stranded wire 27 extends into a metal tube 30 which together with the stranded wires 27 is flattened to provide a composite flat, plate-like portion 31 having a core of stranded wire with top and bottom planar sections. This plate-like portion 31 is provided with a first circular hole 33 and a second hole 35 spaced a substantial distance from the first hole. The auxiliary stud 23 is mounted in the second hole 35 and includes a relatively thin flat head 37, a knurled shank portion 39 immediately adjacent the head 37, and a threaded shank portion 41. During construction of the termination 19, the hole 35 is initially cylindrical and has a diameter less than the external diameter of the knurled portion 39 so that when the stud 23 is driven through the hole 35, the wall of the hole 35 is cold formed into the complimentary shape of the knurled portion 39 of the stud. This provides a good electrical connection between the parts as well as a strong nonrotatable connection. A nut 43 is threaded onto the stud 23 into tight engagement with the upper surface of the plate portion 31. After the nut has been tightened onto the stud, the stud and the nut are soldered to the flattened tubular portion 31 as well as the wire strands 27 located therein.

After the soldering operation has been completed, a plastic cover 45 is molded over the top and bottom of the tube 30 and over the distal end of the plate portion 31. In addition, the cover 45 extends a substantial distance over the cover portion 29 of the cable 17 and is hermetically sealed thereto.

The cover 45 includes a tubular portion 47 which surrounds the hole 33 and extends a substantial distance upwardly therefrom. The tubular portion 47 includes an internal flange 49 which is flexible and removably holds a nut 50 therein for threaded engagement with a battery stud when the termination is subsequently used. The cover 45 also includes an aperture 53 at the bottom which is aligned with the hole 33 and which is adapted to fit tightly over the boss portion of a conventional battery terminal stud. It may be seen that the cover 45 has a bottom surface 55 (FIG. 2) in proximity to the battery cable 17 which extends a substantial distance below the bottom of the central portion of the termination 19. This surface 55 is adapted to rest directly on the upper surface of a battery casing. In like manner the head 37 of the auxiliary stud 33 is covered by a portion of the cover 45 which forms a circular boss 57 having a circular, flat bottom surface 59 which is flush with the bottom surface 55. As a result when the battery cable is placed onto a battery, the surfaces 55 and 59 rest directly against the top of the casing to provide a firm support for the termination 19.

The tubular portion 47 has an external annular bead 61 which is complimentary to a pair of internal grooves 63 in the cap 25 as best shown in FIG. 3. This lip provides a detent for holding the cap 25 in place as shown in phantom in FIG. 4. An annular sealing bead 65 integral with the plastic cover 45 surrounds the nut 43 and engages the bottom of the cap 25 when it is snapped in place onto the tube 47 in the manner shown in FIG. 4.

Referring particularly to FIG. 3, it may be seen that the cap 25 includes two substantially identical tubular cap sections which respectively include an annular groove 63.

Preferably the portion 41 of the auxiliary stud 23 which extends upwardly from the nut 43, and the nut 43 itself provide an exterior surface which is dimensionally the same as conventional battery terminal studs. As a consequence, conventional battery cable terminations such as those shown at 21 in FIG. 1 can be stacked directly over the auxiliary terminal 23 and secured thereto. Moreover, another termination 19 may be stacked on a termination 19 with the stud 23 of the lower termination extending through the hole 33 and the nut 50 of the upper termination.

It may thus be seen that the novel termination 19 of the present invention provides for several possible uses. Moreover, it is strong and durable in construction and provides a low ohmic connection between the auxiliary stud 23 and the battery cable.

While the present invention has been described in connection with a particular embodiment thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed:

1. A termination for connecting an electric cable to a terminal stud of a battery, comprising in combination
   and elongated metal plate mechanically and electrically connected to said cable,
   said plate having a first hole therethrough for receiving said terminal stud, and having a second hole,
   an auxiliary terminal stud having a threaded shank extending through said second hole, and having a flat head portion disposed against one side of said plate,
   a nut threaded on the shank of said auxiliary terminal stud tightly against the side of said plate opposite said one side for fixedly and non-rotationally connecting said auxiliary terminal stud to said plate, said nut and auxiliary terminal stud being soldered to said plate,
   a plastic cover molded directly over said plate with said auxiliary terminal stud extending therefrom, said cover having top and bottom openings aligned with said first hole.

2. A termination according to claim 1 wherein
   said auxiliary terminal stud is provided with a knurled annular portion adjacent said head and disposed in said second hole,
   the sides of said hole being complimentary to the knurled portion of said auxiliary terminal stud received therein.

3. A termination according to claim 1 comprising
   sealing cap means having a first section adapted to be removably and sealably attached to said cover over said top opening and a second section adapted to be removably and sealably attached to said cover over said auxiliary terminal stud.

4. A termination according to claim 3 wherein
   said sealing cap means is adapted to be attached to said cover over said top opening while said auxiliary terminal stud is uncovered.

5. A termination according to claim 4 wherein said sealing cap comprises
   first and second resilient sleeve portions respectively providing said first and second sections.

6. A termination according to claim 1 wherein
   the portion of said plastic cover enclosing said flat head comprises an external circular boss.

7. A termination according to claim 6 wherein
   said cover has a portion which is molded over said cable and depends a predetermined distance from said one side of said plate, and
   said boss depends said same predetermined distance from the one side of said plate.

8. A termination according to claim 1 wherein
   a portion of said nut extends outwardly of said plastic cover.

9. A termination according to claim 8 wherein
   said cover is provided with a circular resilient bead enclosing said nut.

10. A termination for connecting an electric cable to a terminal stud of a battery, comprising in combination
    an elongated metal plate mechanically and electrically connected to said cable,
    said plate having a first hole therethrough for receiving said terminal stud, and having a second hole,
    an auxiliary terminal stud fixedly and non-rotatably connected to said plate having a threaded shank extending through said second hole, and a flat head engaged against one side of said plate said auxiliary terminal stud having an external surface shape the same as said battery terminal stud providing for stacking of a plurality of terminations at said battery terminal stud;
    a nut threaded onto said auxiliary terminal stud against the side of said plate opposite said one side, said nut being soldered to said plate providing for said fixed and nonrotatable connection of said auxiliary terminal stud to said plate; and a plastic cover molded directly over said plate and flat head with said auxiliary terminal stud shank extending therefrom, said cover having top and bottom openings aligned with said first hole.

11. A termination according to claim 10 wherein a portion of said nut extends outwardly of said plastic cover.

12. A termination according to claim 10 wherein the portion of said plastic cover enclosing said flat head comprises an external circular boss.

13. A termination according to claim 12 wherein said cover has a portion which is molded over said cable and depends a predetermined distance from said one side of said plate, and said boss depends said same predetermined distance from the one side of said plate.

14. A termination according to claim 10 wherein said auxiliary terminal stud is provided with a knurled annular portion adjacent said head and disposed in said second hole, the sides of said hole being complementary to the knurled portion of said auxiliary terminal stud received therein.

15. A termination according to claim 14 wherein said cover is provided with a circular resilient bead enclosing said nut.

16. A method of manufacturing a battery cable, comprising the steps of inserting a bare portion of a stranded wire cable into a metal tube, flattening a portion of said tube and said cable, applying melted solder to said flattened cable and said tube, permitting said solder to solidify, then punching first and second spaced holes through the flattened portions of said cable and said tube, inserting a threaded terminal stud through one of said holes with the head of said stud engaging one face of the flattened portion of said tube, tightening a nut onto said terminal, applying melted solder to said stud and said terminal to solder said nut to said terminal stud, and molding over the tube and said head a plastic cover having first and second openings aligned with the other one of said holes and a third opening exposing said nut and a threaded portion of said stud.

* * * * *